A. JARMOLOWSKY.
PIPE THREADING TOOL.
APPLICATION FILED DEC. 15, 1920.

1,428,035.

Patented Sept. 5, 1922.
2 SHEETS—SHEET 1.

WITNESSES

INVENTOR
A. Jarmolowsky,
BY
ATTORNEYS

A. JARMOLOWSKY.
PIPE THREADING TOOL.
APPLICATION FILED DEC. 15, 1920.
1,428,035.
Patented Sept. 5, 1922.
2 SHEETS—SHEET 2.
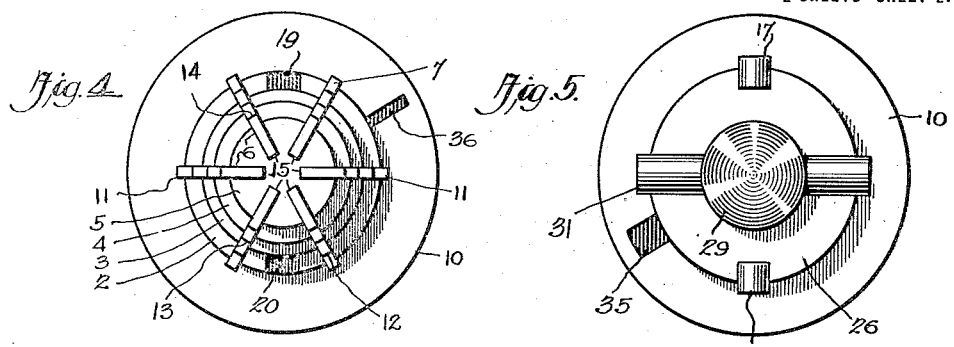
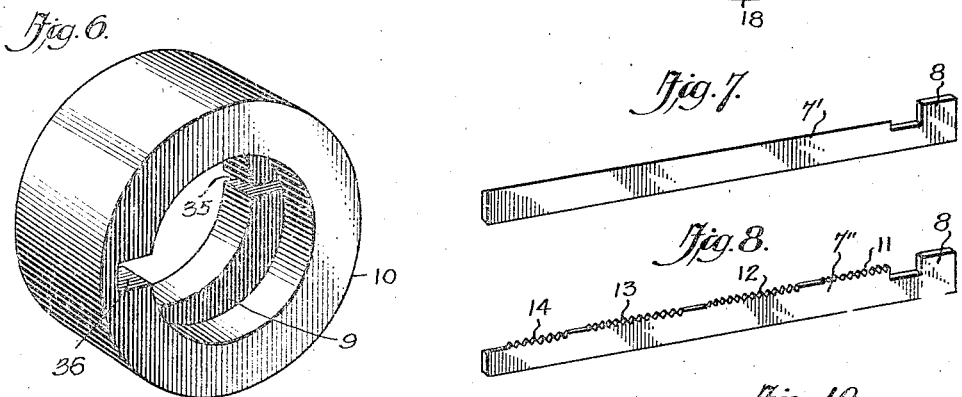
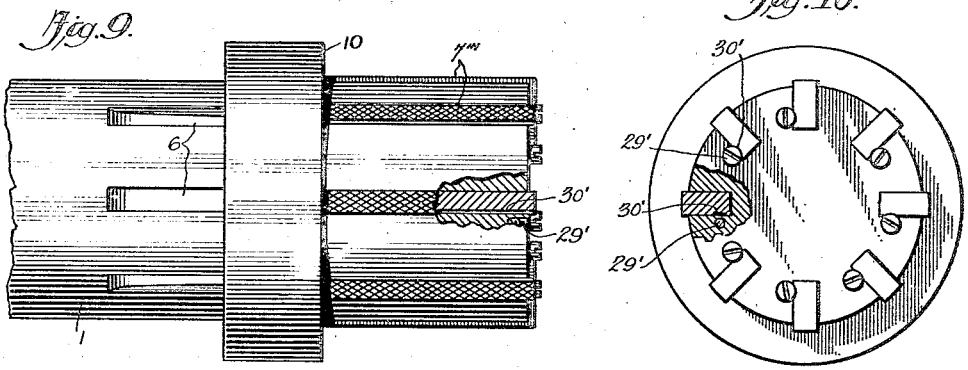
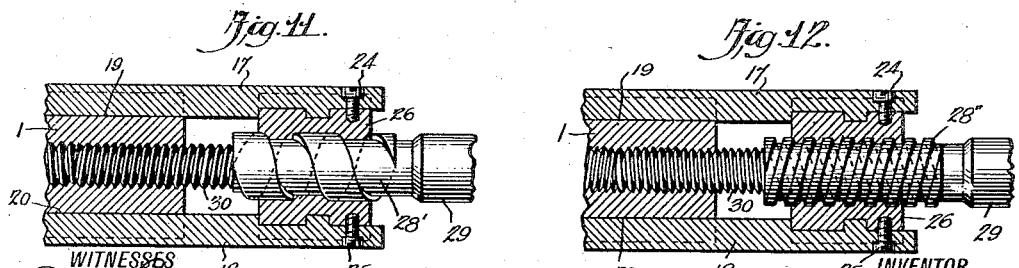
WITNESSES
Frank J. Faggiani
Robert J. Hulsizer
INVENTOR
A. Jarmolowsky.
BY Munn & Co.
ATTORNEYS Patented Sept. 5, 1922.

1,428,035

UNITED STATES PATENT OFFICE.

ABRAHAM JARMOLOWSKY, OF BROOKLYN, NEW YORK.

PIPE-THREADING TOOL.

Application filed December 15, 1920. Serial No. 430,939.

*To all whom it may concern:*

Be it known that I, ABRAHAM JARMOLOWSKY, a citizen of the United States, and a resident of the city of New York, borough of Brooklyn, in the county of Kings and State of New York, have invented a new and Improved Pipe-Threading Tool, of which the following is a full, clear, and exact description.

This invention relates to a tool, and has especial reference to one which is used in connection with the reaming or threading of pipes, particularly short nipples or portions of pipes.

An object of the invention is to provide a tool for gripping nipples or short portions of pipes whereby they may be easily threaded without placing them in a vise.

Another object resides in the provision of a tool which is adapted to grip portions of pipe or tubing to be threaded or treated and which can be quickly and easily operated to grip and release the articles.

A further object resides in the provision of a tool adapted for a plurality of uses and which can be quickly and easily changed from a tool of one character into a tool of another character.

A still further object resides in the particular construction and arrangement of parts hereinafter described and claimed and shown in the accompanying drawings.

The invention, in general, comprises a tool which can be placed readily in a vise and which is provided with a plurality of gripping surfaces adapted to receive small portions of piping and nipples to be threaded. By the simple, quick manipulation of an operating part connected with the tool, the portions to be treated are gripped so that they can be threaded or otherwise treated. Usually and heretofore it has been a very complicated and laborious matter to thread small nipples or pipe, since they have usually been placed in the vise and the part kept in the vise could not be threaded very readily. My invention provides means whereby the entire nipple can be threaded in one operation.

My device is also adapted, by the quick and simple substitution of certain parts, to be used as a reamer and as an internal pipe threader.

The invention is illustrated in the drawings, of which—

Figure 4 is an end view of the device as viewed from the left of Figure 1;

Figure 5 is an end view of the device as viewed from the right in Figure 1;

Figure 6 is a perspective view of the operating collar;

Figure 7 represents a perspective view of a reaming finger;

Figure 8 is a perspective view of a threading finger;

Figure 9 is a partial side elevation of a modified form of tool;

Figure 10 is an end view of the device shown in Figure 9; and

Figures 11 and 12 represent modified forms of operating threads which can be used with my device.

Figure 1:
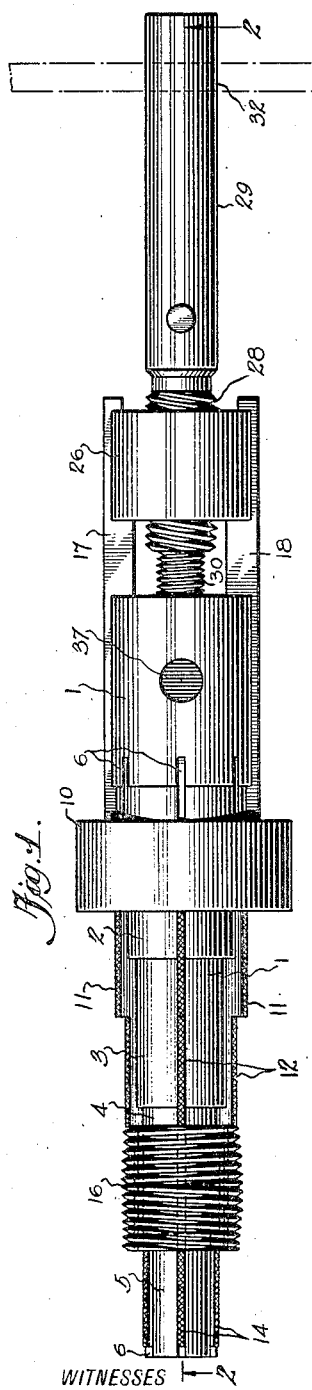
Figure 1 represents a side elevation of the device.
Figure 2:
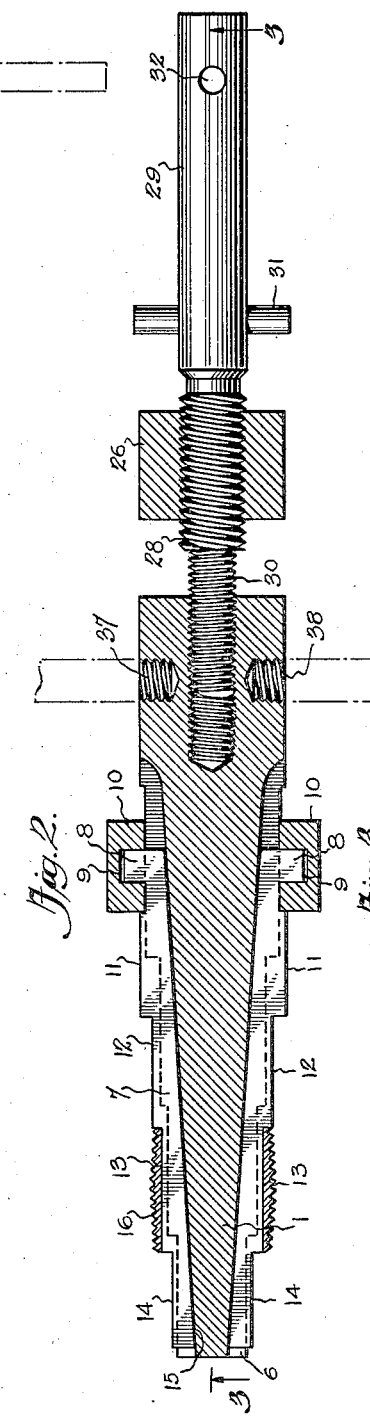
Figure 2 represents a section taken on the line 2—2 of Figure 1.
Figure 3:
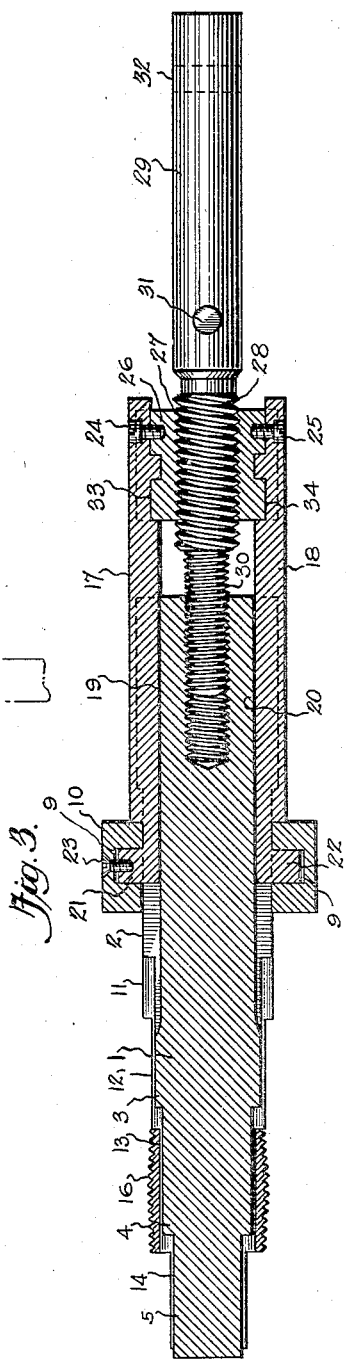
Figure 3 represents a section taken on the line 3—3 of Figure 2.

As shown in the drawings, the tool which represents the preferred embodiment of my invention comprises a body portion 1 which is provided with a plurality of stepped cylindrical surfaces 2, 3, 4 and 5 of progressively decreasing diameters. A plurality of slots 6 extend longitudinally of the body portion and slope downwardly at an angle with the axis toward the end, as shown in Figure 2. In each of these slots 6 a finger 7 is adapted to be disposed. At their inner ends the fingers are provided with an ear portion 8 adapted to project into and engage a slot 9 disposed on the inner peripheral face of a ring-shaped collar 10 disposed around the body portion 1 adjacent the cylindrical surface 2. Each of the fingers 7 is provided with stepped surfaces 11, 12, 13 and 14 arranged to be disposed parallel to and corresponding to the cylindrical surfaces 2, 3, 4 and 5 above mentioned. The bottom surface 15 of each of the fingers 7 lies along the bottoms of the slots 6. It will, therefore, be observed that when the collar 10 is operated to move backward or forward, the fingers 7 are moved backward and forward in the slots 6; and by reason of the slope of the slots, the diameter between the corresponding outer faces 11, 12, 13 and 14 of oppositely disposed fingers is gradually increased as the fingers are drawn up the slots 6. The surfaces 11, 12, 13 and 14 may be roughened so that, as shown in Figure 2, when a nipple or small section of piping 16 is slipped over any portion of the fingers, such as 13, it will be gripped on the inner face thereof by the roughened surface of the portion 13 on the finger 7 to hold it. The body portion 1 may be disposed or placed in a vise to firmly grip the entire tool, while a pipe-threading tool or apparatus is applied to the nipple 16. By this means the entire surface of the nipple 16 can be threaded in one operation.

In order to move the collar 10 backward and forward to increase or decrease the distance between the corresponding portions of the fingers 7, I provide two operating fingers 17 and 18 which extend along suitable slot portions 19 and 20 in the rear end of body portion 1. These fingers 17 and 18 are provided with upwardly turned ear portions 21 and 22 adapted to be disposed in the above-mentioned slot 9 in the collar 10. To prevent the collar 10 from turning on the body portion 1, I may provide a screw 23 connecting the collar 10 with one of the ear portions, such as 21, to hold it from rotation on the body portion 1. The rear ends of the fingers 17 and 18 are connected by screws 24 and 25 to a block 26, which is provided with an interiorly threaded bore 27 through which a threaded portion 28 of an operating shaft 29 passes. The forward end 30 of this shaft 29 is reduced in diameter and provided with a threaded portion the pitch of which is opposite to the pitch of the threaded portion 28. The operating shaft 29 is provided with any suitable handle portion 31 and is also provided with an aperture 32 in which any suitable bar or auxiliary handle may be placed. To maintain the plug 26 in alignment, the fingers 17 and 18 are adapted to lie in slotted portions 33 and 34 longitudinally disposed along the outer opposite faces of the plug 26.

In order readily to insert the fingers 7 in the slot 9 of the collar 10, I provide a groove 35, shown particularly in Figure 6, through which the ear portions 8 of the fingers 7 may be introduced. This introduction is effected by placing the collar in position on the body portion 1 and then rotating it until the slot 35 comes in line with the slot 6 in which the particular finger is to be placed. The finger is then placed in the slot 6 and moved up until the ear portion 8 passes through the slot 35, whereupon the collar 10 is rotated into position to register the slot 35 with another of the slots or grooves 6, whereby another finger may be placed in position. Similarly, the operating fingers 17 and 18 can be introduced into engagement with the collar 10 in a similar manner by reason of the slot 36 in the rear portion of the collar 10, shown in Figure 6 particularly.

The body portion 1 may also be provided with suitable threaded portions 37 and 38 into which suitable auxiliary handles may be placed when it is desired to move the body portion for purposes to be hereinafter described. It is apparent, of course, that the plurality of stepped cylindrical portions 2, 3, 4 and 5 and the corresponding stepped surfaces 11, 12, 13 and 14 of the fingers 7 are provided to adapt the tool for use to grip a plurality of nipples 16 of different internal diameters. When the shaft portion 29 is rotated in one direction, the plug 26 is moved to the left with respect to the body portion 1, thereby moving the fingers 17 and 18 which force the collar 10 to the left. This collar in turn moves the fingers 7 to the left down the sloping surface of the slot 6, whereby the diametrical distance between the corresponding portions of the finger 7 are decreased. A reverse movement of the shaft 29 will cause, in a manner clearly apparent, the movement of finger 7 to the right, as shown in Figure 2, to increase the above-mentioned diametrical distance, whereby any suitable nipple, such as 16, can be firmly gripped.

As shown in Figure 7, the fingers 7' therein illustrated may be adapted to act as reamer cutting edges instead of pipe grippers.

In Figure 8 I show fingers 7'' which may be provided with thread-cutting teeth whereby an interior thread may be cut on any suitable pipe section.

Figures 9 and 10 illustrate a modified form of tool adapted for larger sizes of pipe and larger pieces of work, wherein the fingers 7''' are made of heavier material. These fingers are adapted to project beyond the ends of the body portion 1. Because of the force to which these fingers are subjected, means are provided to prevent their end portions from riding up in the slots 6. This means comprises headed screws 29' which are placed in grooves in the ends of the body portion 1 adjacent the ends of the fingers 7''' so that the heads of the screws lie against corresponding cut-away groove portions 30' in a lateral face of each finger 7'''. As shown in Figure 10, particularly, this engagement will permit the longitudinal movement of the fingers but not a lateral movement, the groove 30' being of sufficient length to permit the mechanism longitudinal movement of the fingers.

In Figure 11 the portion 28' is shown with a thread of very large pitch, whereby a quick binding and releasing action may be effected.

Figure 12 illustrates a threaded portion 28'' in which a double thread is used.

If it is desired to use this tool to ream or cut threads, suitable handles are inserted in the portions 37 and 38; the proper fingers, such as those illustrated in Figures 7 and 8, are inserted in the body portion in relation with the collar 10 and the slots 6 and the tool is thereby adapted to be used as a reamer or thread cutter. On the other hand, the normal use of the tool resides in its use in a vise engaging the outer face of collar 10 whereby various sizes of short sections of pipes or nipples may be firmly held on the body portion separate from the vise so that the entire threading of these short sections may be effected in one operation.

It is, therefore, apparent that I have provided a simple, compact and efficient apparatus whereby a plurality of functions may be performed by the one tool the various parts of which can be modified in minor aspects without departing from the spirit of the invention.

What I claim is:

1. A tool comprising a body portion having a plurality of slots therein, a plurality of finger bars disposed in said slots, a collar slidable on the body portion and engaging one end of the finger bars, said body portion having a threaded bore, a shaft having a threaded portion adapted to extend into said bore, an oppositely threaded portion on said shaft, a block disposed around the oppositely threaded portion, and link connections between the block and the collar, said shaft adapted to be rotated, whereby the collar and the finger bars are moved with respect to the body portion.

2. A tool comprising a body portion having a plurality of longitudinal slots therein, said slots being inclined to the axis of the body portion, a plurality of finger bars disposed in said slots, a plurality of stepped operating surfaces on said finger bars disposed parallel to the axis of the body portion, a collar engaging one end of the finger bars, said body portion being provided with a threaded bore, a shaft having a threaded portion adapted to engage said bore, an oppositely threaded portion on said shaft, a block engaging said oppositely threaded portion, and link connections between the block and the collar, said shaft adapted to be rotated, whereby the collar and finger bars are moved at will with respect to the body portion to vary the distance between the operating surfaces and the axis of the body portion as desired.

ABRAHAM JARMOLOWSKY.